Figure 1:
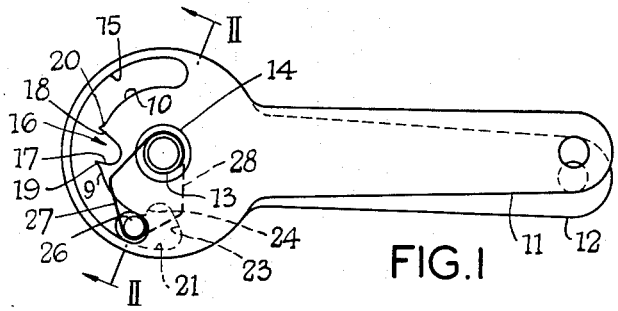

Aug. 31, 1965  P. C. R. FERNBERG  3,203,272

LOCKING STAYS

Filed Jan. 22, 1964  2 Sheets-Sheet 1

INVENTOR:
PAUL CARL ROGER FERNBERG,
BY Walter P. Jones  ATT'Y.

Aug. 31, 1965   P. C. R. FERNBERG   3,203,272
LOCKING STAYS

Filed Jan. 22, 1964   2 Sheets-Sheet 2

INVENTOR:
PAUL CARL ROGER FERNBERG,
By Walter S. Jones
ATT'Y.

United States Patent Office 3,203,272
Patented Aug. 31, 1965

3,203,272
LOCKING STAYS
Paul Carl Roger Fernberg, Farnham Common, England, assignor to United-Carr Incorporated, a corporation of Delaware
Filed Jan. 22, 1964, Ser. No. 339,547
Claims priority, application Great Britain, Jan. 31, 1963, 4,091/63
8 Claims. (Cl. 74—527)

This invention relates to locking stays and, in one preferred form, to locking stays with at least two "locked" positions either of which may be selected.

According to the invention there is provided a locking stay comprising a first member having a first flat face and a first profiled edge thereof, said first profiled edge including a first notch, having first and second sides, and first and second cam portions extending away from the first and second sides respectively of the first notch; a second member having a second flat face portion and a second profiled edge thereof; connecting means holding the first and second face portions in sliding contact with one another and constraining the second member to move, relative to the first member, only forwardly in a defined direction and backwardly in the relatively opposite direction; the second profiled edge including a second notch having first and second sides which in one relative position of the first and second members are approximately in register with the first and second sides respectively of the first notch; and the stay also comprising a locking member which is slidable along the first and second profiled edges and is spring-urged to bear thereagainst and, in the said one relative position of the first and second members; to enter the first and second notches; the first side of the first notch and the second side of the second notch being so disposed that on forward movement of the second member from its said one position relative to the first member they combine to cam the locking member out of the notches and, the second side of the second notch extending beyond the first side of the first notch, to carry the locking member on to the said first cam portion; and the second profiled edge further comprising a third cam portion, extending away from the first side of the second notch, and a stop portion limiting the third cam portion at the end thereof remote from the second notch, such that as the second member is moved backwardly towards its said one position relative to the first member the locking member is forced by the stop portion off the first cam portion, over the first notch and on to the second cam portion, being prevented by the third cam portion from entering the first notch.

Figure 2:
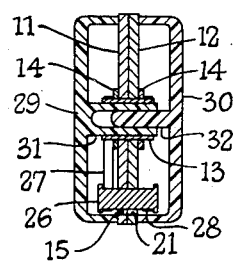
Figure 3:
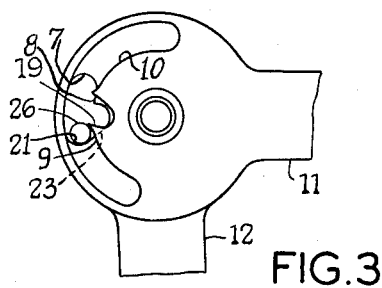
Figure 4:
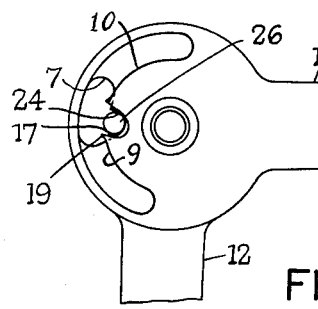
Figure 5:
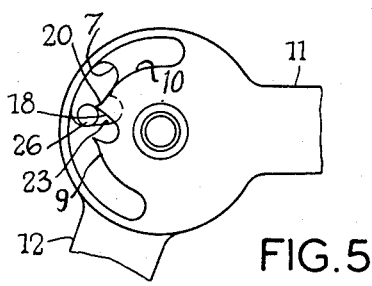
Figure 6:
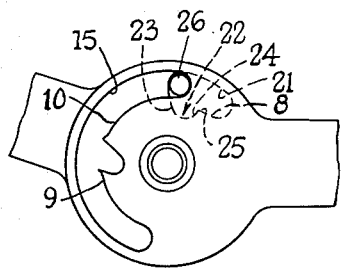
Figure 7:
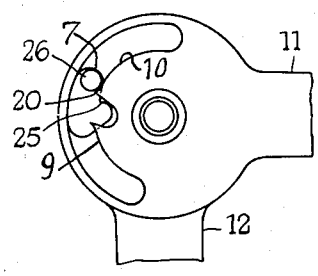
Figure 8:
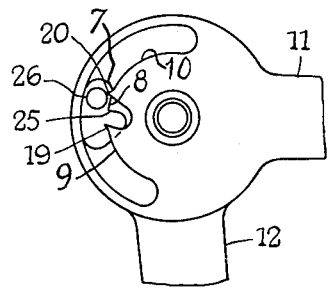
Figure 10:
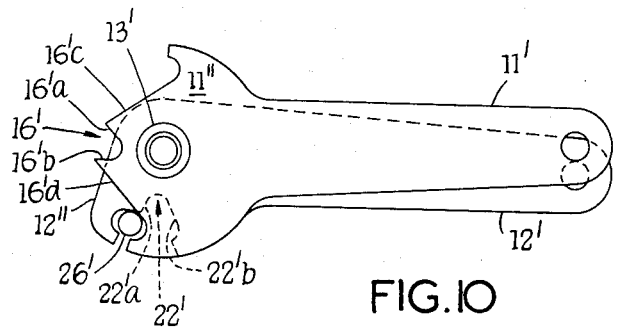
Figure 11:
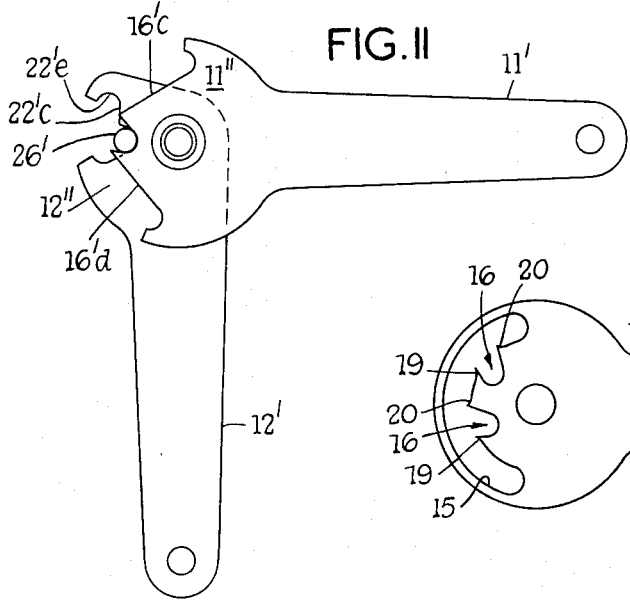
Figure 9:
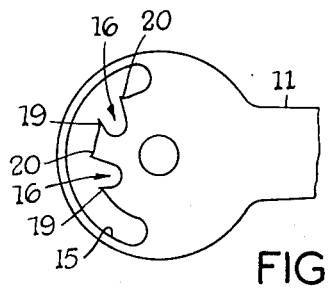
Figure 12:
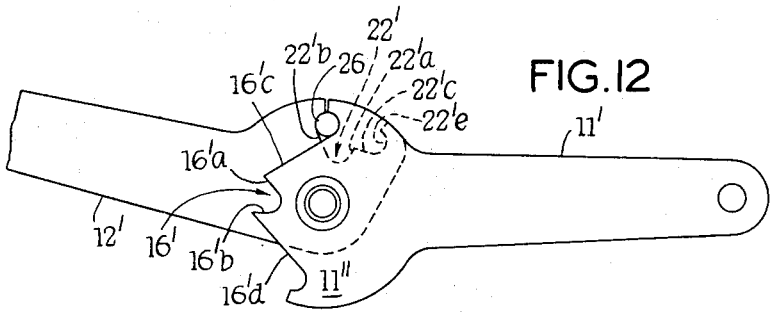

Preferred embodiments of a locking stay according to the invention as described below with reference to the accompanying drawings, in which:

FIGURE 1 is an elevational view of a first locking stay in closed position, parts being omitted for clarity, FIGURE 2 is a sectional view, taken on the line II—II of FIGURE 1, of the locking stay shown in FIGURE 1, FIGURES 3 to 8 are broken elevational views of the locking stay shown in FIGURE 1, in a variety of positions, FIGURE 9 is a broken elevational view of a part of another embodiment of the invention, and FIGURES 10, 11 and 12 are representations of a third embodiment of the invention, in three different positions thereof corresponding to the positions of the first embodiment, shown in FIGURES 1, 4 and 6 respectively.

The locking stay illustrated in FIGURES 1 to 8 comprises a pair of arms 11 and 12, constituting first and second members respectively of the stay, each formed with a circular disc-like end which provides a first or a second flat face of the respective member and which is apertured centrally to receive a tubular pivot 13 about which the arms 11 and 12 are mutually pivotable. Spring washers 14, forced over the ends of the pivot 13, hold the flat faces of the disc-like ends of the arms in sliding face-to-face engagement with one another, and the pivot 13 and washer 14 constitute connecting means constraining the arm 12 to move, relative to the arm 11, only forwardly and backwardly in a defined direction, namely pivotally about the pivot 13.

The disc-like end of the plate 11 is formed with a part-circular slot 15 centred on the mutual pivotal axis of the arms and extending round a semicircle approximately. The radially inward side of the slot 15 constitutes a first profiled edge of the first member, namely the arm 11, and is formed, approximately midway between its ends, with a first notch 16 having first and second side walls 18 and 17 respectively which, at their radially outer ends, form with the respectively adjacent portions of the radially inner side wall of the slot 15 two teeth 19 and 20 which project radially outward relative to the generally circular contour of the radially inner wall of the slot 15. The arcuate portions of the radially inner side of the slot 15 constitute, with the sides of the teeth 20 and 19 respectively with which they emerge, first and second cam portions 10 and 9 respectively of the said first profiled edge of the arm 11, extending away from the first and second sides 18 and 17 respectively of the first notch 16. The disc-like end of the arm 12 is also formed with a part-circular slot 21 whose shape is best seen in FIGURE 6. The slot 21 also centred on the mutual pivot axis of the arms, is relatively short and is formed at one end on its radially inward side with a second notch 22 having a side wall 23 which merges into the adjacent end wall of the slot 21 and a side wall 24 which forms with the respectively adjacent part of the radially inner side wall of the slot 21, a corner 25. The side walls 24 and 23 constitute first and second sides respectively of the second notch 22 which, with the two ends of the slot 21 and the arcuate inner side thereof extending away from the notch 21, constitutes for the arm 12 a second profiled edge, the said arcuate inner side of the slot 21 constituting a third cam portion 8 comprised by the second profiled edge.

Passing through both the slots 15 and 21, with its axis parallel to the mutual pivotal axis of the arms 11 and 12, is a cylindrical pin 26 with flanged ends. The pin 26, constituting locking means of the stay, is urged radially inwardly by means of two springs 27 and 28, each of which is hooked at one of its ends round a respective end of the tubular pivot 13 and at its other end round the corresponding end of the pin 26, whose flanges serve to retain the springs in position.

As shown in FIGURE 2, there are further provided two circular covering caps 29 and 30, whose peripheral flanged edges bear against the outer edges of the disc-like ends of the arms 11 and 12 respectively. The cap 29 is formed with a hollow central spigot 31 which is a push fit in the tubular pivot 13, and the cap 30 has a central spigot 32 which is a tight friction fit in the spigot 31. For the sake of clarity, the caps 29 and 30 and the end flanges of the pin 26, are not indicated in FIGURES 1 and 3 to 8, and the springs 27 and 28 are not indicated in FIGURES 3 to 8.

FIGURE 1 shows the locking stay almost completely closed, with its arms 11 and 12 overlying one another. In the following description, it is assumed that the arm 11 is held still while the arm 12 is pivoted relative thereto. As the arm 12 is pivoted clockwise, i.e. forwardly, through about 90° to the position shown in FIGURE 3, the pin 26 is pushed against the radially outwardly projecting tooth 19 by that end of the slot 21 with which the side wall 23 of the notch 22 merges. Further clockwise movement of the arm 12, and thus of the pin 26, results in the pin being cammed radially outwardly, against the urging of the springs 27 and 28 (whose radially inner ends are rotatably slidable on the pivot 13), by the tooth 19, until the pin 26 passes over the tooth 19 and is pulled radially inwardly by the springs 27 and 28, into the notches 16 and 22 which are then in register. The locking stay is then in the locked position shown in FIGURE 4, and anticlockwise (i.e. backward) movement of the arm 12 is prevented by engagement of the pin 26 between the opposed side walls 17 and 24 of the notches 16 and 22 respectively. For this purpose, the side walls 17 and 24 are so disposed relative to one another, in the locked position of the stay, that they do not tend to cam the pin 26 radially outwardly; and to this end, the side wall 24 extending substantially radially, the side wall 17 preferably undercuts the tooth 19 to some extent.

To unlock the stay, further clockwise rotation of the arm 12 is necessary, and when this occurs the walls 23 and 18, of the notches 22 and 16 respectively, co-operate to cam the pin 26 radially outwardly against the springs 27 and 28. To this end, the walls 23 and 18 are arranged suitably obliquely in opposite senses. FIGURE 5 shows the pin 26 cammed outwardly to such an extent that it is bearing against the tooth 20. A slight further clockwise movement of the arm 12 carries the pin 26 over the tooth 20 to bear radially inwardly against the radially inner side of the slot 15. Further clockwise motion of the arm 12 is then possible until an over-dead-centre position is reached in which, as shown in FIGURE 6, further clockwise motion is prevented by engagement of the pin 26 by oppositely facing end walls of the slots 15 and 21.

Once the pin 26 has surmounted the tooth 20 (and whether or not further clockwise movement of the arm 12 is effected, towards the position shown in FIGURE 6), the locking stay can be returned, by anticlockwise movement of the arm 12, to the closed position shown in FIGURE 1. As the arm 12 is rotated anticlockwise, the pin 26 is pressed, as shown in FIGURE 7, against the tooth 20 by the stop portion 7 formed by that end of the slot 21 which is remote from the notch 22. Continued anticlockwise movement of the arm 12 causes the pin 26 to rise (radially outwardly, against the springs 27 and 28) over the tooth 20; having surmounted the tooth 20, the pin 26 is, however, prevented (as shown in FIGURE 8) by the third cam portion 8, adjacent the notch 22, from entering the notch 16. Further anticlockwise movement of the arm 12 causes the pin 26 to be carried over the notch 16 without entering it and to be cammed, in similar manner, over the tooth 19, and the arm 12 can then finally be further rotated anticlockwise until the FIGURE 1 position is resumed.

The locking stay shown in FIGURES 1 to 8 may conveniently be one of two similar stays used with the hood of a perambulator. The stays are attached so that in their over-dead-centre position (FIGURE 6) they stretch the hood in its fully raised position, in normal manner. In the locked position shown in FIGURE 4, the stays then hold the hood positively in a half-raised position.

It will be understood that more than one locking position may be provided by providing additional notches, like the notch 16 and each with its associated teeth 19 and 20, at various positions along the length of the slot 15. An arm 11 for an embodiment with two locking positions is shown in FIGURE 9. It will be understood that on opening the stay having an arm 11 as shown in FIGURE 9, it first locks (but only against closing) in the first locked position and then, if the opening movement is continued, proceeds to the second locked position. On being closed from its second locked position, it does not lock in the first position as an intermediate step.

It may also be noted that the provision of teeth such as the teeth 19 and 20 can be avoided by setting the radially inner edge of the slot 15 at a greater distance from the axis of pivot 13 than the radially inner edge of the slot 21. Again, if the pin 26 were spring urged radially outwardly instead of inwardly, the notches in both slots would be at the radially outward edges thereof; and an equivalent rectilinear embodiment of the invention, with the two major components of the stay movable relative to one another linearly instead of pivotally can obviously be developed from the pivotal version described above.

The embodiment of the invention shown in FIGURES 10, 11 and 12, is generally similar to and operates in essentially the same manner as that shown in FIGURES 1 to 8, but the first and second profiled edges of its first and second members respectively are slightly different in detail through their various features will be readily identifiable as corresponding to features of the embodiment already described. The locking stay shown in FIGURES 10, 11 and 12 comprises first and second members 11' and 12' having first and second flat faces 11" and 12" respectively held in pivotal sliding contact with one another by pivotal connecting means 13' which is not shown in detail but which may be identical with the pivot pin 13 and spring washer 14 shown in FIGURE 2. The first flat face 11" is formed with a first profiled edge constituted by a first notch 16' having first and second sides 16'a and 16'b and by first and second cam portions 16'c and 16'd, respectively, extending away from first and second sides 16'c and 16'd of the first notch 16'. The second flat face 12" is formed with a second profiled edge constituted by a second notch 22' with first and second sides 22'a and 22'b, a third cam portion 22'c extending away from the first side 22'a of the second notch 22', and a stop portion 22'e limiting the third cam portion 22'c at the end thereof which is remote from the second notch 22'. Co-operating with the first and second profiled edges is a locking pin 26' similar to the pin 26 shown in FIGURES 1 to 8 and similarly spring-urged by spring means which, however, for clarity of the drawings is not shown in FIGURES 10 to 12.

The locking stay shown in FIGURE 10 is in its closed position, corresponding to FIGURE 1; and the intermediate-locked and fully-open positions shown in FIGURES 11 and 12 correspond to the positions shown in FIGURES 4 and 6 respectively. Detailed description of the operation of the locking stay shown in FIGURES 10 to 12 will be unnecessary, since it is virtually identical with that of the locking stay shown in FIGURES 1 to 8. It will be appreciated that the first and second cam portions 16'c and 16'd are equivalent to the respective arcuate radially inner side portions of the slot 15 which extend away from the notch 16 and to the outwardly projecting teeth 20 and 19 respectively with which those slot side portions merge.

What I claim is:

1. A locking stay comprising: a first member having a first flat face and a first profiled edge thereof, said first profiled edge including a first notch, having first and second sides, and first and second cam portions extending away from the first and second sides respectively of the first notch; a second member having a second flat face portion and a second profiled edge thereof; connecting means holding the first and second face portions in sliding contact with one another and constraining the second member to move, relative to the first member, only forwardly in a defined direction and backwardly in the relatively opposite direction; the second profiled edge including a second notch having first and second sides which in one relative position of the first and second members are approximately in register with the first and second sides respectively of the first notch; and the stay also comprising a locking member and spring means which urge the locking member against the first and second profiled edges, the locking member being adapted to slide along the first and second profiled edges and, in the said one relative position of the first and second members, to enter the first and second notches; the first side of the first notch and the second side of the second notch forming a dihedral angle such that on forward movement of the second member from its said one position relative to the first member they combine to cam the locking member out of the notches and, the second side of the second notch extending beyond the first side of the first notch, to carry the locking member on to the said first cam portion; and the second profiled edge further comprising a third cam portion, extending away from the first side of the second notch a distance greater than one half the maximum width of the first notch and terminating in a stop portion at the end thereof remote from the second notch, such that as the second member is moved backwardly the locking member is forced by the stop portion off the first cam portion and carried onto the second cam portion by the third cam portion which is of sufficient length to prevent re-entry of the locking member into the first notch.

2. A locking stay as claimed in claim 1, wherein the said connecting means is constituted by pivot means which constrains the second member to move only forwardly and backwardly pivotally relative to the first member.

3. A locking stay as claimed in claim 2, wherein the first and second profiled edges extend generally in a circumferential direction round the pivot means and the first and second notches extend generally radially inward towards the pivot means.

4. A locking stay as claimed in claim 3, wherein the first and second profiled edges are the radially inward edges of two slots formed in the first and second flat faces respectively and extending therearound generally in a circumferential direction round the pivot means.

5. A locking stay as claimed in claim 1, wherein the first profiled edge, at that end of one of its said first and second cam portions which is remote from the first notch, is formed with an additional notch which is generally similar to the first notch and with an additional cam portion extending away from the additional notch on the side thereof which is more remote from the first notch.

6. A locking stay as claimed in claim 2, wherein said spring means which urge the locking member against the first and second profiled edges is anchored on the said pivot means.

7. A locking stay as claimed in claim 6, wherein the locking member comprises a pin extending generally parallel with the pivotal axis of said pivot means and the spring means which urge the locking member against the profiled edges comprises two springs each having a first end which engages a respective end of said pin and a second end which is anchored on the corresponding end of said pivot means.

8. A locking stay as claimed in claim 2, wherein the pivot means comprises a pivot pin which is tubular and there are provided a first covering cap formed with a tubular spigot projecting into the tubular pivot pin from one end thereof and a second covering cap formed with a spigot projecting into the tubular pivot pin from the other end thereof and into the said tubular spigot as a tight friction fit therein.

No references cited.

BROUGHTON G. DURHAM, *Primary Examiner.*